United States Patent [19]

Sugino et al.

[11] Patent Number: 5,087,664
[45] Date of Patent: Feb. 11, 1992

[54] PLASTISOL COMPOSITION AND UNDERCOATING MATERIAL

[75] Inventors: Satoru Sugino, Yokkaichi; Yoshimichi Kobayashi, Yokohama, both of Japan

[73] Assignees: Mitsubishi Kasei Vinyl Company; Mitsubishi Kasei Corporation, both of Tokyo, Japan

[21] Appl. No.: 661,254

[22] Filed: Feb. 27, 1991

Related U.S. Application Data

[60] Division of Ser. No. 268,043, Nov. 7, 1988, Pat. No. 5,030,673, which is a continuation of Ser. No. 895,813, Aug. 12, 1986, abandoned.

[30] Foreign Application Priority Data

| Aug. 19, 1985 | [JP] | Japan | 60-181194 |
| Dec. 23, 1985 | [JP] | Japan | 60-290250 |
| Feb. 17, 1986 | [JP] | Japan | 61-32376 |

[51] Int. Cl.$^5$ .............................................. C08L 75/04
[52] U.S. Cl. .................................. 525/124; 524/507; 528/45
[58] Field of Search .......................... 525/124; 528/45; 524/507

[56] References Cited

U.S. PATENT DOCUMENTS

| 3,621,000 | 11/1971 | Schmelzer et al. | 528/45 |
| 3,947,426 | 3/1976 | Lander | 528/45 |
| 4,444,954 | 4/1984 | Mels et al. | |

FOREIGN PATENT DOCUMENTS

| 5118948 | 9/1980 | Japan | 525/124 |
| 7165442 | 10/1982 | Japan | 525/124 |
| 9120651 | 7/1984 | Japan | 525/124 |
| 0106871 | 6/1985 | Japan | 525/124 |

OTHER PUBLICATIONS

Hawley's Condensed Chemical Dictionary Eleventh Ed. Van Nostrand Reinhold Company, New York (1987), pp. 864, 621.

Primary Examiner—Melvyn I. Marquis
Assistant Examiner—Thomas Hamilton, III
Attorney, Agent, or Firm—Oblon, Spivak, McClelland, Maier & Neustadt

[57] ABSTRACT

A plastisol composition comprising a vinyl chloride polymer, a plasticizer and an adhesion-imparting agent, characterized in that the adhesion-imparting agent is a diisocyanate polymer blocked with an oxybenzoic acid ester or with an alkylphenol and having an average molecular weight within a range of from 1,000 to 10,000.

8 Claims, No Drawings

PLASTISOL COMPOSITION AND UNDERCOATING MATERIAL

This is a division of application Ser. No. 07/268,043, filed on Nov. 7, 1988, now U.S. Pat. No. 5,030,673 which is a continuation of application Ser. No. 06/895,813, filed Aug. 12, 1986, now abandoned.

The present invention relates to a plastisol composition most suitable for applications for bonding or coating, and an undercoating material composed of such a plastisol useful as a sealer or undercoating material for automobile industries and various other industries.

A coating (top coating) is applied to automobiles and various industrial products. Prior to the application of this coating, it is common to apply a pre-treatment coating commonly called an undercoating for the purpose of sealing, protection of the substrate or facilitating the surface finish. Such an undercoating is essential particularly to an automobile body to which a cation-type electrodeposition precoating is applied. A polyvinyl chloride plastisol composition as an undercoating material for such an undercoating is not yet widely used because its adhesion is not adequate.

As a method for improving the adhesion of the plastisol, it is known to incorporate an organic polyisocyanate compound to the plastisol. For instance, it is disclosed to add to the plastisol an isocyanate polymer obtained by trimerizing tolylene diisocyanate (TDI) in UK Patent No. 1,455,701 or an isocyanate polymer of isocyanate-isocyanurate obtained by partially trimerizing a two component mixture comprising TDI and diphenylmethane diisocyanate (MDI). These isocyanate polymers have free isocyanate groups (NCO) at their terminals, and they are extremely reactive and thus inferior in the storage stability of the plastisol, in the operation efficiency such as non-uniformity in the application of the plastisol to the substrate or formation of air bubbles, and in the quality stability.

Namely, when a plastisol is prepared by mixing an isocyanate polymer having terminal NCO groups in an inert solvent e.g. a plasticizer, there have been problems such as (1) a substantial decrease in the adhesion strength, (2) gradual viscosity increase or solidification as time passes and (3) formation of air bubbles, by the influence of a small amount of moisture or a metal catalyst remaining in the plasticizer.

Therefore, with respect to the metal component, it has been required to limit the amount to the minimum, and there has been a problem that if the amount is too small, the formed sheet undergoes substantial coloring. Therefore, the application has been limited to a very restricted blend system, and there have been various drawbacks such that the processing and operation process are restricted.

In recent years, there have been proposed a method wherein an active amino group-containing mono- or poly-amide compound is added, as an agent for promoting the dissociation of a blocked polymer (hereinafter referred to simply as a "block dissociation-promoting agent") to a plastisol of a urethane polymer containing an oxime as a blocking agent (Japanese Examined Patent Publication No. 52901/1984); a method wherein a compound selected from the group consisting of nitrogen-containing polyols, amino-alcohols and fatty acid alkanol amides, is added, as a block dissociation-promoting agent, to a urethane prepolymer containing an oxime or lactam as a blocking agent (Japanese Unexamined Patent Publication No. 78279/1984); a method wherein a mono- or poly-carboxylic acid is further added to the above-mentioned composition of Japanese Examined Patent Publication No. 52901/1984 and Japanese Unexamined Patent Publication No. 120651/1984; and a method wherein an alkylene oxide-added polyol is added to a lactam-blocked polyisocyanate, an active amino group-containing polyamide and a low molecular weight amine (Japanese Unexamined Patent Publication No. 131669/1984).

However, in the above references, (a) the method wherein an active amino group-containing mono- or poly-amide is used as a block dissociation-promoting agent, has drawbacks such that dehydrochlorination from the polyvinyl chloride is promoted, and the product tends to undergo a color change by heat and is inferior in the color fastness to light and in the water resistance; (b) the polyisocyanate contains urethane linkages of a polyol and an aliphatic or aromatic isocyanate, whereby there is a problem of the formation of air bubbles during the processing, and the product is not satisfactory as to the water resistance and weather resistance for a long run; and (c) the blocking agent is an oxime or a lactam, whereby the compatibility with the resin component after dissociation or with a plasticizer is inferior, thus leading to blooming or bleeding, and when contacted with an acid, the oxime undergoes hydrolysis, and the lactam forms a crystalline salt, such being problematic. Thus, they are likely to impair the stability, such as the heat resistance or the water resistance, of the shaped product.

The present inventors have conducted extensive researches to overcome the conventional difficulties and to develop a plastisol composition which can be used in combination with various additives, which is free from the deterioration of the properties even in a high temperature, high humidity atmosphere, which does not undergo a color change or the formation of air bubbles, which can be processed in a stabilized state, and yet which is capable of providing a high adhesive strength. As a result, it has been found possible to achieve the above object by adding a certain specific blocked diisocyanate polymer to the plastisol, as an adhesion-imparting agent. The present invention has been accomplished on the basis of this discovery.

Namely, it is an object of the present invention to provide a plastisol composition which is capable of being processed under various conditions such as high temperature and high humidity conditions without a color change, formation of air bubbles or a deterioration of the adhesive strength.

Another object of the present invention is to provide an undercoating material composed essentially of such a plastisol composition containing an adhesion-imparting agent having good storage stability and being capable of firmly bonding to a electro-deposited metal in a short period of time within a wide temperature range from a relatively low temperature to a high temperature.

The present invention provides a plastisol composition comprising a vinyl chloride polymer, a plasticizer and an adhesion-imparting agent, characterized in that the adhesion-imparting agent is a diisocyanate polymer blocked with an oxybenzoic acid ester or with an alkylphenol and having an average molecular weight within a range of from 1,000 to 10,000.

Further, the present invention provides an undercoating material composed of a plastisol composition comprising a vinyl chloride polymer and a plasticizer as main components, wherein the plastisol composition contains a diisocyanate polymer blocked with an oxybenzoic acid ester or with an alkylphenol, as an adhesion-imparting agent.

Now, the present invention will be described in detail with reference to the preferred embodiments.

The vinyl chloride polymer as the main component of the plastisol composition of the present invention, is a paste resin having an average particle size of at most 5 μm, preferably from 0.05 to 3 μm, prepared by the emulsion polymerization of vinyl chloride or a mixture of vinyl chloride with a comonomer copolymerizable therewith, in the presence of an emulsifier and an aqueous polymerization initiator, or a paste resin or a resin to be blended with a paste resin prepared by microsuspension polymerization which comprises mechanically finely dispersing a part or entire amount of vinyl chloride or a mixture of vinyl chloride with a comonomer copolymerizable therewith, in the presence of a dispersant and an oil-soluble polymerization initiator, followed by polymerization. Further, a vinyl chloride resin or a vinyl chloride copolymer resin having a large particle size produced by a usual suspension polymerization may be incorporated in an amount not to adversely affect the viscosity, fluidity, processability, etc. of the plastisol or organosol. As the comonomer copolymerizable with vinyl chloride, there may be mentioned a vinyl ester such as vinyl acetate, vinyl propionate or vinyl laurate; an acrylate such as methyl acrylate, ethyl acrylate or butyl acrylate; a methacrylate such as methyl methacrylate or ethyl methacrylate; a maleate such as dibutyl maleate or diethyl maleate; a fumarate such as dibutyl fumarate or diethyl fumarate; a vinyl ether such as vinyl methyl ether, vinyl butyl ether or vinyl octyl ether; a nitrile such as acrylonitrile or methacrylonitrile; an α-olefin such as ethylene, propylene or styrene; a vinylidene halide or vinyl halide other than vinyl chloride, such as vinylidene chloride or vinyl bromide; and N-methylol acrylamide. At least one of these comonomers may be employed in an amount of not more than 30% by weight, preferably not more than 20% by weight.

For the polymerization of a vinyl chloride polymer, it is common to use an emulsifier containing an alkali metal salt. However, in view of the adhesive properties of the composition of the present invention, it is desirable in the present invention to select an emulsifier so that the alkali metal content in the vinyl chloride polymer will be not higher than 900 ppm. As an emulsifier which brings about such a low alkali metal content in the vinyl chloride polymer, an ammonium salt or an alkali metal salt of an fatty acid having an alkyl group with from 8 to 18 carbon atoms may be mentioned as an example. However, the emulsifier is not restricted to such a specific example.

There is no particular restriction as to the plasticizer to be used as a component of the plastisol composition of the present invention, and any plasticizer may be employed so long as it is suitable for use for a vinyl chloride polymer. For instance, there may be mentioned a phthalate plasticizer such as di-n-butyl phthalate, di-n-octyl phthalate, di-2-ethylhexyl phthalate (DOP), diisooctyl phthalate, octyldecyl phthalate, diisodecyl phthalate, butylbenzyl phthalate, di-2-ethylhexyl isophthalate or a mixed alkyl phthalate; a fatty acid ester plasticizer such as di-2-ethylhexyl adipate (DOA), di-ni-decyl adipate, diisodecyl adipate, di-2-ethylhexyl azelate, dibutyl cebacate or di-2-ethylhexyl cebacate; a phosphate plasticizer such as tributyl phosphate, tri-2-ethylhexyl phosphate, 2-ethylhexyldiphenyl phosphate or tricresyl phosphate; and an epoxy plasticizer such as epoxidized soybean oil or epoxidized tall oil fatty acid-2-ethylhexyl. These plasticizers may be used alone or in combination as a mixture of two or more different kinds. The amount of the plasticizer to be used is properly selected depending upon the desired solid content or the fluidity of the paste sol, and is usually within a range of from 30 to 600 parts by weight, preferably from 50 to 200 parts by weight, relative to 100 parts by weight of the vinyl chloride resin.

Further, a part of the plasticizer may be substituted by a diluent such as hexanol isobutyrate or dodecylbenzene or by an organic solvent capable of permitting the vinyl chloride resin to swell such as toluene or xylene, to form an organosol. The amount of the diluent or the organic solvent is properly determined depending upon the particular use.

The plastisol composition of the present invention contains a diisocyanate polymer blocked with an oxybenzoic acid ester or an alkylphenol as its one component. The blocked diisocyanate polymer preferably has an average molecular weight within a range of from 1,000 to 10,000. If the average molecular weight of the blocked polymer is less than 1,000, no adequate adhesion is obtainable, and the adhesive strength will be inadequate. On the other hand, if the average molecular weight is greater than 10,000, the viscosity of the sol composition tends to be extremely high. As the diisocyanate (monomer) constituting the isocyanate polymer, there may be mentioned an fatty acid diisocyanate such as hexamethylene diisocyanate or lysine diisocyanate; an alicyclic diisocyanate such as hydrogenated diphenylmethane diisocyanate, isophorone diisocyanate or hydrogenated tolylene diisocyanate; and an aromatic diisocyanate such as tolylene diisocyanate, diphenylmethane diisocyanate, naphthylene diisocyanate or xylene diisocyanate. Among them, the aromatic diisocyanate, particularly tolylene diisocyanate or diphenylmethane diisocyanate is especially preferred. Then, the diisocyanate polymer can be obtained by the polymerization in accordance with a conventional method in an inert solvent such as ethyl acetate, methyl acetate, butyl acetate, methyl ethyl ketone or dioxane, or in a plasticizer such as a phthalate, a phosphate, an adipate or a trimellitate by using a well known catalyst such as a tertiary amine, a Mannich base, an alkali metal salt of a fatty acid or an alcoholate. The isocyanate polymer is then subjected to a blocking reaction with an oxybenzoic acid ester or with an alkyl phenol, to obtain a blocked diisocyanate polymer. When the polymerization reaction or the blocking reaction is conducted in a highly volatile solvent, it is preferred to finally substitute the solvent by a proper high boiling point solvent such as a plasticizer.

It is particularly preferred to employ a diisocyanate polymer obtained by the polymerization of a diisocyanate monomer and containing isocyanurate rings, as the diisocyanate polymer to be used in the present invention. The polymer containing isocyanurate rings may be prepared in accordance with the above-mentioned method. It is of course possible to employ as the isocyanate polymer, a polyurethane or polyurea having so-called isocyanate terminal groups, obtained by the reaction of diisocyanate with an active hydrogen compound.

The oxybenzoic acid ester to be used as the blocking agent, includes an o-oxybenzoic acid ester, a m-oxybenzoic acid ester or a p-oxybenzoic acid ester. Among them, particularly preferred is a p-substituted ester.

The other group constituting the oxybenzoic acid ester is preferably a long chain alkyl group such as a n-hepthyl group, a n-octyl group, a 2-ethylhexyl group, a nonyl group or a dodecyl group; an alkoxyalkyl group having a long chain polyoxyethylene or polyoxypropylene group bonded thereto, or an alkoxy alkyl group having a long chain alkyl group with an oxyethylene or oxypropylene group bonded thereto, in the case of m- and p-substituted esters. In the case of o-substituted esters, an alkyl group such as a methyl group, an ethyl group, an isopropyl group, an isoamyl group, a n-butyl group, an isobutyl group, a sec-butyl group, a n-heptyl group, a n-octyl group, a 2-ethylhexyl group, a nonyl group or a dodecyl group; an alkoxyalkyl group having a (poly)oxyethylene or (poly)oxypropylene group bonded thereto; or an aryl group such as a phenyl group or a benzyl group, may be mentioned.

The alkylphenol used as a blocking agent is a phenol having, as a substituent, an alkyl group having at least 4 carbon atoms. For instance, butylphenol, hexylphenol, octylphenol or nonylphenol may be mentioned. Of course, the useful alkylphenol is not restricted to these specific examples.

The blocking agent is used usually in an amount about stoichiometic to free isocyanate groups of the diisocyanate polymer.

The amount of the blocked diisocyanate polymer is usually within a range of from 1 to 25 parts by weight, preferably from 2 to 17 parts by weight, per 100 parts by weight of the vinyl chloride polymer, so that the effective NCO content in the plastisol composition is usually within a range of from 0.03 to 1% by weight, preferably from 0.03 to 6% by weight, more preferably from 0.05 to 0.5% by weight. For instance, when a dibutyl phthalate solution containing 33% by weight of a diisocyanate polymer blocked with an oxybenzoic acid ester prepared by the polymerization and blocking in dibutyl phthalate, is to be used, the solution is employed in an amount of from 2 to 50 parts by weight per 100 parts by weight of the vinyl chloride polymer. If the amount of the plasticizer is inadequate, the plasticizer is supplemented to obtain a plastisol composition. Likewise, since the effective NCO content in the 33% dibutyl phthalate solution may vary, the diluent is properly adjusted to bring the NCO content in the plastisol composition to a desired level. If the NCO content is less than 0.03% by weight, the effects for adhesion tends to be poor. On the other hand, if the content exceeds 1% by weight, undesirable phenomena such as an increase of the viscosity and coloring of the sol, are likely to occur, and a bubble-forming phenomenon due to absorption of moisture and vigorous reaction is observed at the bonding interface, whereby the adhesive strength tends to deteriorate.

The plastisol composition of the present invention preferably contains an agent for promoting the dissociation of the blocked structure of the oxybenzoic acid ester- or alkylphenol-blocked diisocyanate polymer. As such a block dissociation-promoting agent, an inorganic or organic compound of an alkali metal and an inorganic or organic compound of a metal such as lead, tin, cadmium or zinc, may be mentioned. It is desirable to use at least one of these compounds.

As the alkali metal compound, a potassium or sodium salt or a potassium-zinc or sodium-zinc composite stabilizer of a fatty acid, particularly a fatty acid having an alkyl group with from 8 to 18 carbon atoms, an alkylsulfuric acid, an alkylarylsulfonic acid, an alkylsulfonic acid or a polyoxy ethylene adduct thereof, may be mentioned. The metal compound other than the alkali metal compound, includes an inorganic metal compound such as white lead, basic lead silicate, tribasic lead sulfate, tribasic lead phosphite, silica gel co-precipitated lead silicate or zinc white, and an organic compound such as a metal salt, e.g. a cadmium, barium, calcium, zinc, lead, tin or magnesium salt, of lauric acid, stearic acid, ricinolic acid, naphthenic acid, salicylic acid, 2-ethylhexoinic acid fatty acid or resin acid, and it also includes zinc octylate, dibutyltin laurate, dioctyltin maleate and dibutyltin mercaptide. Further, it is possible to employ organic acid liquid composite stabilizers of e.g. calcium-zinc, barium-zinc, magnesium-zinc, cadmium-barium-zinc types, which are commercially available usually as stabilizers for vinyl chloride resins. Among them, lead-type or tin-type compounds are particularly preferred.

With respect to the amount of the block dissociation-promoting agent, the alkali metal compound may be incorporated in the plastisol composition preferably in an amount of not higher than 900 ppm as the alkali metal relative to the vinyl chloride polymer. In a case where an alkali metal is already contained in an emulsifier used for the preparation of the vinyl chloride polymer, such an amount is taken into account as the alkali metal amount for the calculation of the content of the alkali metal, so that a proper amount of the alkali metal compound as the block dissociation-promoting agent may be added. If the alkali metal content exceeds 900 ppm, the hygroscopic properties of the plastisol during or after its preparation tend to increase, whereby the stability of the plastisol viscosity and the adhesion reaction will be substantially impaired and the processability tends to deteriorate, and the adhesion strength is likely to deteriorate. When the metal compounds other than the alkali metal compounds are used as the block dissociation-promoting agents, there is no particular restriction as to the amount used, as they serve also as stabilizers. However, it is common to use them in an amount of from 0.5 to 10 parts by weight, preferably from 1 to 5 parts by weight, per 100 parts by weight of the vinyl chloride polymer, to attain the object. Further, the adhesion strength can be synergistically improved by using the alkali metal compound together with the compound of a metal such as lead, tin, cadmium or zinc.

For the preparation of the plastisol composition of the present invention, the vinyl chloride polymer, the plasticizer and the adhesion-imparting agent, are uniformly mixed, if necessary, together with the block dissociation-promoting agent and other additives.

In the present invention, it is preferred (1) to use a vinyl chloride polymer which has been stored in a completely sealed state immediately after its preparation, (2) to apply a vacuum defoaming step during the plastisol preparation prior to the addition of the adhesion-imparting agent, and (3) to conduct, after the addition of the adhesion-imparting agent, the stirring and mixing with the gas phase either vacuumed for defoaming or substituted by an inert gas such as nitrogen.

During the preparation of the composition, the entrance of moisture into the composition should be avoided as far as possible. More specifically, it is desirable that the preparation is conducted in an atmosphere having a relative humidity of not higher than 80%. In general, if the mixing is conducted in an atmosphere having a relative humidity of higher than 80%, a very small amount of moisture at a level of at least 0.2% by weight will be absorbed in the plastisol.

The plastisol composition of the present invention may be used as an adhesive, as a rust preventive or as a laminating agent, for nylon fibers or woven fabrics, polyester fibers or woven fabrics, or for sheet-form substrates such as sheets or films of a natural leather or a synthetic resin such as nylon or polyester, or for cationic electrodeposition coated plates. The application to the sheet-form substrates may be conducted by various means such as a reverse roll method, a knife coater method, a spray method, a curtain flow method, a dip coating method, a rotary screen method, a flat screen method, a flexor method or a gravure printing method.

The sheet-form substrate coated with the plastisol composition, is heated to a temperature of from 120° to 210° C. to dissociate the block polymer to form a vinyl chloride resin coating layer firmly on the sheet-form substrate. Otherwise, after the sheet-form substrate coated with the plastisol composition, was heated to a temperature lower than the dissociation temperature of the block polymer structure and the plastisol composition was melted, cooled and solidified, a separate woven fabric, sheet or film is laid thereon and press-bonded under-heating at a temperature higher than the dissociation temperature of the blocked polymer, to obtain a laminated sheet.

The plastisol composition of the present invention can be prepared without losing the adhesive properties even in a high temperature and high humidity atmosphere, and has the stability in the sol viscosity and the adhesion strength remarkably improved over the conventional adhesive sol compositions.

In the case where the adhesion-imparting agent is an oxybenzoic acid ester-blocked diisocyanate polymer, it is possible to obtain a laminate having high adhesion strength even by lamination at a low temperature of about 160° C. In this case, the blocking agent undergoes dissociation at a relatively low temperature of from 120° to 160° C. to provide excellent adhesion.

In the case where the adhesion-imparting agent is a long chain alkyl phenol-blocked diisocyanate polymer, the dissociation of the blocking agent does not proceed at a low temperature of up to 130° C., and various or complicated treating methods may be employed, for instance, the composition once treated for gelation at a low temperature can be again used for lamination.

Since the adhesion-imparting agent contained in the plastisol composition is a diisocyanate polymer blocked with an oxybenzoic acid ester or with a long chain alkyl phenol, and no amine-type block dissociation-promoting agent is contained, there will be no formation of air bubbules, no coloring or no decomposition of the vinyl chloride polymer during the processing, and the adhesion strength will be remarkably high. Further, in the composition, the dissociation of the blocking agent does not proceed, even when heated to a temperature not higher than about 100° C., and thus the composition has good stability in the sol viscosity and good storage stability.

For the undercoating material of the present invention, it is preferred to employ, as a combination which satisfies the low temperature melting properties, the adhesive properties and the storage stability, a mixture comprising, as a vinyl chloride polymer, a paste resin composed of a homopolymer of vinyl chloride having an average degree of polymerization of at most 1600, and a resin to be blended with the paste resin (i.e. a blending resin) composed of a vinyl chloride-vinyl acetate copolymer having an average particle size of from 10 to 50 μm and having a vinyl acetate content of from 1 to 10% by weight. The amount of the blending resin to be incorporated, is usually preferably within a range of from 5 to 50% by weight based on the total vinyl chloride polymer.

To the undercoating material of the present invention, various additives other than the above components, such as a filler, a thickener, a coloring agent and the like may be incorporated. Of course, other additives are not restricted to such specific examples. The filler includes an inorganic filler such as precipitated or ground calcium carbonate, talc, diatomaceous earth, kaolin or barium sulfate, and an organic filler such as cellulose powder, rubber powder or regenerated rubber. The thickener includes anhydrous silica, organic bentonite or a metal soap. When the plastisol composition contains moisture, a small amount of a powder such as calcium oxide, magnesium oxide or silicon oxide, may be added as a moisture absorber.

The undercoating material of the present invention may be applied to various industrial purposes as a coating material for primer coating or for pretreatment of the substrate surface. Particularly, in the automobile industry, it is particularly useful as a primer coating material for a top coating synthetic resin coating material such as an alkyd resin coating material, an epoxy resin coating material or an acrylic resin coating material, as applied on an automobile body to which a cationic electrodeposition coating has been applied, for the purpose of the prevention of rusts, or for the purpose of damping the shock when hit by an object such as a small stone, or for the purpose of sealing pin holes or the like.

The above-mentioned cationic electrodeposition coating may be conducted in such a manner that a coating material such as an aqueous solution or aqueous dispersion prepared by neutralizing e.g. a polyamide resin (e.g. an epoxy resin having amino groups in the molecule) with a lower organic acid, is deposited on the surface of the object to be coated (automobile body) by conducting a direct current by using the object (automobile body) as the cathode.

The undercoating material of the present invention may be applied usually in a coating amount of from 500 to 3000 g/m². The thickness of the coating layer may be adjusted within a wide range of from 0.3 to 2 mm. Of course, the coating amount and the thickness are not restricted to the above ranges, and may be adjusted to any desired levels. The undercoating material may be applied by any conventional method. For instance, spray coating, brush coating, dipping and spreading are main coating methods. As other means, the coating may be made by using various equipments such as a reverse rolls, a knife coater, a rotary screen, a flat screen, a flexor or a gravure printer. The undercoating material coated on the object, is then heated usually to a temperature of from 120° to 210° C. to dissociate the block polymer to form a coating layer on the surface of the object.

The heat treatment after the coating in the present invention is preferably-conducted at a temperature within a range of from 120° to 150° C. for from 20 to 40 minutes by using a block dissociation-promoting agent, whereby a coating layer having good properties will be obtained.

The undercoating material of the present invention contains a diisocyanate polymer blocked with an oxybenzoic acid ester or with an alkylphenol, as an adhesion-imparting agent in the plastisol composition, and is capable of being firmly bonded to a metal surface or to a cation electrodeposition coated surface by heat treatment at a relatively low temperature in a short period of time. The plastisol composition constituting the undercoating material has good storage stability, whereby no substantial increase in the viscosity is observed even when left for a long period of time, and the coating operation to the object is simple. Further, even when the blocking agent is dissociated from the diissocynate polymer, there will be no substantial bleeding or blooming phenomena since the compatibility with the plasticizer and/or the vinyl chloride polymer is good. Further, the undercoating material of the present invention does not contain an amine-type block dissociation-promoting agent, there will be no coloring or no substantial decomposition of the vinyl chloride polymer during or after the coating operation. Therefore, there will be no problem of color change even when the top coating layer is relatively thin. The coating layer obtained by the undercoating material of the present invention has various advantages such as excellent water resistance.

Now, the present invention will be described in further detail with reference to examples. However, it should be understood that the present invention is by no means restricted to these specific Examples.

The methods for the evaluation of plastisol compositions in the following examples, are as follows:

(1) Quantitative Analysis of an Alkali Metal

The amount of the alkali metal was determined by an atomic-absorption spectroscopy.

Namely, 10 g of a sample such as a vinyl chloride polymer or a block dissociation-promoting agent, was stirred in 300 ml of distilled water for 8 hours, and then filtered with a filter paper (5A, manufactured by Toyo Kagaku Sangyo K. K.). The filtrate was further filtered through a millipore filter of 0.22 μm. The filterate was analyzed by an atomic spectroscopy (by using Joulel Ash AA 8200 analyzer, manufactured by YANACO). The metal content was quantitatively analyzed based on the values of an external calibration chart preliminarily obtained.

(2) Measurement of the Plastisol Viscosity

The plastisol viscosity at 5 rpm was measured at a plastisol temperature of 23° C. by means of B8H Model viscometer manufactured by Tokyo Keiki K. K. For the measurement of the plastisol viscosity as time passes, the plastisol was stirred gently for one minute with a stirring rod two hours before the measurement.

(3) Peel Strength

A plastisol composition was coated on a polyethylene terephthalate woven fabric of 335 g/m² or on a polyethylene terephthalate film having a thickness of 90 μm by a knife coater in a thickness of 0.8 mm or 0.1 mm, respectively, and then heated for five minutes at a temperature of 160° C., 175° C. or 190° C. in a hot air circulation-type dryer to obtain a laminate wherein a vinyl chloride resin was laminated on the polyethylene terephthalate woven fabric or the polyethylene terephthalate film. The laminate was left for three days in a constant temperature room, and then cut into test pieces having a width of 2.54 cm and a length of 8 cm. From one end of each test piece, the coating layer was peeled in the direction of the length at a pulling speed of 50 mm/min by 180° T-type peeling test to determine the adhesion strength to the polyethylene terephthalate woven fabric or to the polyethylene terephthalate film. The peel strength was represented by an average peel strength (unit: kg/inch) of five test pieces.

(4) Evaluation of the Coloring and the Formation of Air Bubbles

The formation of air bubbles and the coloring state in the vinyl chloride polymer layer of the laminate prepared for the peel strength test, were examined by visual observation and evaluated in accordance with the following standards.

○: None
△: Some
×: Substantial

EXAMPLE 1 AND COMPARATIVE EXAMPLES 1 TO 3

Vinyl chloride polymer (paste resin, alkali metal content: 770 ppm): 100 parts by weight
Plasticizer (di-2-ethylhexyl phthalate DOP): 60 parts by weight
Epoxy stabilizer (FEP-13, tradename, manufactured by Adeka Argus K. K.): 3 parts by weight
Ba-Zn type stabilizer and block dissociation-promoting agent (AC-303, tradename, manufactured by Adeka Argus K. K.): 3 parts by weight
CaO: 1.5 parts by weight
Adhesion-imparting agent: Various amounts The above identified components were left to stand for a few days in a constant temperature and humidity chamber at a temperature of 23° C. under a relative humidity of 50%, then weighed and mixed in a constant temperature room in the following manner.

The paste resin, DOP (corresponding to 45 phr), the stabilizer and block dissociation-promoting agent, were introduced into a Hobart mixer, and uniformly mixed and kneaded, and then a predetermined amount of a dibutyl phthalate (DBP) solution of the adhesion-imparting agent was added thereto. Further, DOP was added to bring the amount to 60 parts by weight, and the composition was uniformly mixed, and then vacuumed for defoaming to obtain a plastisol composition.

The details of the composition, the plastisol viscosity, the peel strength (adhesive strength to the polyethylene terephthalate woven fabric), the formation of air bubbles and the coloring, were as shown in Table 1.

For the purpose of comparison, tests were conducted in the same manner as the above Example with respect to a composition wherein no adhesion-imparting agent was added, a composition wherein a non-blocked TDI polymer was used and a composition wherein a commercially available polyisocyanate was used.

TABLE 1

|  | Example 1 | Comparative Example 1 | Comparative Example 2 | Comparative Example 3 |
|---|---|---|---|---|
| Plastisol composition |  |  |  |  |
| Adhesion-imparting agent | TDI polymer blocked with nonyl phenol | No addition | TDI polymer (not blocked) | Polyisocyanate/* polyamide |
| Average molecular weight | 1182 | — | 522 | — |
| Solution concentration (wt. %) | 32 | — | 25 | 30 |
| Effective NCO content (wt. %) in the solution | 2.54 | — | 3.8 | 4.0 |
| Amount of the solution added (phr) | 10 | — | 10 | 6.3/2.0 |
| Effective NCO content (wt. %) in the sol | 0.14 | 0 | 0.22 | 0.14 |
| Plasticol viscosity (cps) |  |  |  |  |
| Initial | 4,000 | 3,200 | 4,800 | 2,000 |
| 1 day later | 4,000 | 4,400 | Not measurable due to solidification | 2,200 |
| 4 days later | 4,600 | 4,600 | " | 3,000 |
| 7 days later | 4,800 | 4,800 | " | 3,600 |
| 30 days later | 8,000 | 7,200 | " | — |
| Physical properties of the laminate product |  |  |  |  |
| Heating temperature (°C.) | 160 175 190 | 160 175 190 | 160 175 190 | 160 175 190 |
| Peel strength (kg/inch) | 3.3 5.5 8.1 | 1.0 1.5 2.0 | 4.2 5.6 8.3 | — 1.8 — |
| Formation of air bubbles | ○ ○ ○ | ○ ○ ○ | ○ ○ Δ | — ○ — |
| Coloring | ○ ○ Δ | ○ ○ ○ | ○ Δ X | — X — |

*Commercially Available Polyisocyanate: A TDI-ethylene glycol adduct blocked with ε-caprolactam.
Commercially Available Polyamide: A polyamide having active amino groups, amine value: 236.

In the case of the TDI polymer in Comparative Example 2, the plastisol viscosity stability is extremely poor, and the composition underwent gelation and solidification as soon as one day later, whereby it was impossible to measure the viscosity.

In the case of the polyisocyanate/polyamide type adhesion-imparting agent in Comparative Example 3, the coloring was substantial, and the peel strength was low.

At the same time, a test was conducted in the same manner as in Example 1 except that 10 parts by weight of a DBP solution containing 32% by weight of TDI having an average molecular weight of 614 and blocked with nonyl phenol (effective NCO content: 4.4 wt. %) was used, to examine the peel strength, etc. due to the difference in the average molecular weight of the adhesion-imparting agent. The results are also shown in Table 2.

TABLE 2

|  | Example 2 | Example 3 | Comparative Example 4 |
|---|---|---|---|
| Effective NCO content (wt. %) in the plastisol | 0.07 | 0.21 | 0.25 |
| Plastisol viscosity (cps) |  |  |  |
| Initial | 3,600 | 4,400 | 2,800 |
| 7 days later | 5,600 | 5,600 | 3,200 |
| Heating temperature (°C.) of the laminate product | 160 175 190 | 160 175 190 | 160 175 190 |
| Peel strength | 2.2 3.5 5.5 | 3.5 6.5 8.7 | 2.0 2.4 2.7 |
| Air bubbles | ○ ○ ○ | ○ ○ Δ | ○ ○ ○ |

In the case of the plastisol composition of the present invention, the plastisol viscosity stability was substantially equal to the composition of Comparative Example 1, and yet a remarkable improvement in the peel strength was observed.

EXAMPLES 2 AND 3 AND COMPARATIVE EXAMPLE 4

Tests were conducted in the same manner as in Example 1 except that the amount of the DBP solution containing 32% by weight of the TDI polymer blocked with nonyl phenol, was changed to 5 parts by weight and 15 parts by weight, respectively to examine the peel strength due to the difference in the NCO content. The results are shown in Table 2.

From the above results, it is evident that in order to maintain adequate peel strength, the adhesion-imparting agent is required to have a relatively high molecular weight at a level of an average molecular weight of at least 1000 and the effective NCO content in the plastisol is required to be at least 0.07% by weight. In Example 3, the heating rate under the heating condition of 190° C. was rapid, whereby a certain amount of air bubbles appeared.

EXAMPLES 4 TO 8

Tests were conducted in the same manner as in Example 1 except that various paste resins having different alkali metal contents were used. The results are shown in Table 3 together with the results in Example 1.

TABLE 3

|  | Examples | | | | | |
| --- | --- | --- | --- | --- | --- | --- |
|  | 4 | 5 | 6 | 7* | 1 | 8 |
| Alkali metal content (ppm) relative to the resin | 30> | 45 | 220 | 600 | 770 | 1,000 |
| Plastisol viscosity (cps) initial | 9,000 | 9,000 | 3,520 | 49,200 | 4,000 | 7,000 |
| 7 days later | 13,200 | 23,040 | 5,000 | 58,060 | 4,800 | 12,180 |
| 175° C. heating, peel strength (kg/inch) | 3.5 | 4.0 | 4.5 | 4.5 | 5.5 | 3.0 |
| Formation of air bubbles | ○ | ○ | ○ | Δ | ○ | Δ |
| Coloring | ○ | ○ | ○ | ○ | ○ | Δ |

*A vinyl acetate-containing copolymer was used.

It is evident that the adhesion strength (peel strength) improves almost in proportion to the alkali metal content. However, if the alkali metal content exceeds 1000 ppm, the adhesion strength decreases, and it is evident that a resin containing an alkali metal within a range of from 45 to 770 ppm is preferred.

EXAMPLES 9 AND 10 AND COMPARATIVE EXAMPLES 5 AND 6

Tests were conducted in the same manner as in Example 1 except that the paste resins used in Examples 1 and 4 (alkali metal content: 770 ppm and less than 30 ppm) were used as the vinyl chloride polymer, and the operation after the addition of the DBP solution of the adhesion-imparting agent during the preparation of the plastisols was conducted under a relative humidity of 80%. The plastisol viscosity, the peel strength and the formation of air bubbles were examined in the same manner as in Example 1, and the results are shown in Table 4. For the purpose of comparison, a test was conducted in the same manner with respect to the adhesion-imparting agent used in Comparative Example 2 (non-blocked TDI polymer), and the results are also shown in Table 4.

TABLE 4

|  | Example 9 | Comparative Example 5 | Example 10 | Comparative Example 6 |
| --- | --- | --- | --- | --- |
| Alkali metal content in the paste resin | 770 ppm | | 30 ppm> | |
| Adhesion-imparting agent | Blocked | Non-blocked | Blocked | Non-blocked |
| Effective NCO content (wt. %) in the sol | 0.14 | 0.22 | 0.14 | 0.22 |
| Plastisol viscosity (cps) | | | | |
| Initial | 3,000 | 269,300 | 7,400 | 5,000 |
| 1 day later | 3,420 | Gel and solidified | 7,800 | 108,000 |
| 6 days | 3,440 | | 9,400 | Gel and solidified |
| Peel strength (kg/inch) 170° C. × 5 minutes | 4.7 | 2.8 | 3.4 | 6.1 |
| Formation of air bubbles | Δ | X | ○ | ○ |

In the tests under a relative humidity of 80%, the plastisol viscosity stability was good in Examples 9 and 10, whereas in Comparative Examples, the plastisols underwent solidification as time passed, whereby the plastisol viscosity stability was too poor to be practically useful. In Example 9 where the alkali metal content was high, the peel strength was even higher than that in Example 10 probably because the dissociation of the blocked polymer was thereby facilitated. However, the absorption of moisture tends to increase, thus leading to the formation of air bubbles. In Comparative Example 5, the effective NCO content decreased due to the absorption of moisture, whereby the peel strength became extremely poor. Thus, the peel strength varies depending upon the alkali metal content. From the results of various tests, the most appropriate amount is within a range of from 200 to 800 ppm.

EXAMPLES 11 TO 15

Tests were conducted in the same manner as in Example 1 except that the paste resins having alkali metal contents of 770 ppm and 220 ppm as used in Examples 1 and 6, respectively, were used, and the type of the stabilizer and block dissociation-promoting agent was changed to (A) tribasic lead sulfate, (B) dibutyltin mercaptide and (C) a Na-Zn type composite stabilizer (alkali metal content relative to the resin: 285 ppm). The results are shown in Table 5.

TABLE 5

|  | Example | | | | |
| --- | --- | --- | --- | --- | --- |
|  | 11 | 12 | 13 | 14 | 15 |
| Paste resin | Same as used in Example 6 | | | Same as used in Example 1 | |
| Stabilizer | (A) | (B) | (C) | (A) | (B) |
| Total alkali metal content (ppm) | 220 | 220 | 505 | 770 | 770 |
| Plastisol viscosity (cps) | | | | | |
| Initial | 4,480 | 2,400 | 3,200 | 5,200 | 3,600 |
| 7 days later | 6,800 | 3,400 | 5,600 | 7,600 | 4,600 |
| Peel strength (kg/inch) of the laminated product heated at 175° C. for 5 min. | 4.1 | 4.0 | 4.3 | 5.2 | 4.8 |
| Formation of air bubbles | Δ | ○ | ○ | ○ | Δ |

EXAMPLE 16

Vinyl chloride polymer (paste resin, alkali metal content: 220 ppm): 100 parts by weight
Plasticizer (di-2-ethylhexyl phthalate (DOP)): 60 parts by weight
Epoxy stabilizer (FEP-13, tradename, manufactured by Adeka Argus K. K.): 3 parts by weight Ba-Zn type stabilizer and block dissociation-promoting agent (AC-303, tradename, manufactured by Adeka Argus K. K.): 2 parts by weight Dibutyl phthalate (DBP) solution of adhesion-imparting agent: Various amounts The above identified components were left to stand for a few days in a constant temperature and humidity chamber at a temperature of 23° C. under a relative humidity of 50%, then weighed and mixed in a constant temperature room in the following manner.

The paste resin, DOP (corresponding to 45 PHR), the stabilizer and block dissociation-promoting agent, were introduced into a Hobart mixer, and uniformly mixed and kneaded, and then a predetermined amount of a dibutyl phthalate (DBP) solution of the adhesion-imparting agent was added thereto. Further, DOP was added to bring the amount to 60 parts by weight, and the composition was uniformly mixed, and then vacuumed for defoaming to obtain a plastisol composition.

The details of the composition, the plastisol viscosity, the peel strength (adhesive strength to the polyethylene terephthalate woven fabric), the formation of air bubbles and the coloring, were as shown in Table 6.

TABLE 6

|  | Example 16 |
|---|---|
| Plastisol composition |  |
| Adhesion-imparting agent | TDI isocyanurate polymer blocked with p-oxybenzoic acid 2-ethylhexyl ester |
| Average molecular weight | 1,300 |
| Solution concentration (wt. %) | 33 |
| Effective NCO content (wt. %) in the solution | 2.52 |
| Amount of the solution added (phr) | 15 |
| Effective NCO content (wt. %) in the plastisol | 0.21 |
| Plastisol viscosity (cps) |  |
| Initial | 3,000 |
| 2 days later | 4,000 |
| 7 days later | 4,600 |
| 14 days later | 6,000 |
| 21 days later | 7,200 |
| 30 days later | 8,200 |
| Physical properties of the laminate product |  |
| Heating temperature (°C.) | 160  175  190 |
| Peel strength (kg/inch) | 5.6  6.6  7.8 |
| Formation of air bubbles | ○  ○  ○ |
| Coloring | ○  ○  △ |

Whereas in the plastisol composition of the present invention, the plastisol viscosity stability is good, and a remarkable improvement was observed in the peel strength even at such a low heating temperature as 160° or 175° C., as compared with the composition of Comparative Example 2.

EXAMPLES 17 AND 18 AND COMPARATIVE EXAMPLE 7

Tests were conducted in the same manner as in Example 16 except that the amount of the DBP solution containing 33% by weight of the TDI polymer blocked with p-oxybenzoic acid 2-ethylhexyl ester was changed to 5 parts by weight and 10 parts by weight, to examine the peel strength due to the difference in the NCO content. The results are shown in Table 7.

At the same time, a test was conducted in the same manner as in Example 16 except that 10 parts by weight of a DBP solution containing 33% by weight of TDI having an average molecular weight of 674 and blocked with p-oxybenzoic acid 2-ethylhexyl ester (effective NCO content: 4.2 wt. %), was used, to examine the peel strength due to the difference in the average molecular weight of the adhesion-imparting agent. The results are shown in Table 7.

TABLE 7

|  | Example 17 | Example 18 | Comparative Example 7 |
|---|---|---|---|
| Effective NCO content (wt. %) in the plastisol | 0.07 | 0.14 | 0.24 |
| Plastisol viscosity (cps) |  |  |  |
| Initial | 2,960 | 3,000 | 2,900 |
| 7 days later | 3,760 | 4,000 | 3,800 |
| Heating temperature (°C.) of the laminate product | 160  175  190 | 160  175  190 | 160  175  190 |
| Peel strength | 4.2  4.3  4.5 | 4.5  5.5  6.4 | 2.2  2.4  2.7 |
| Air bubbles | ○  ○  ○ | ○  ○  ○ | ○  ○  ○ |

From the above results, it is evident that in order to maintain adequate peel strength, the adhesion-imparting agent is required to have a relatively high molecular weight at a level of an average molecular weight at least 1000, and the effective NCO content in the plastisol is required to be at least 0.05% by weight.

EXAMPLES 19 TO 21

Tests were conducted in the same manner as in Example 18 except that paste resins having different alkali metal contents were used. The results are shown in Table 8 together with the results of Example 18.

TABLE 8

|  | Examples | | | |
|---|---|---|---|---|
|  | 19 | 18 | 20 | 21 |
| Alkali metal content (ppm) relative to the resin | 45 | 220 | 600 | 770 |
| Plastisol viscosity (cps) |  |  |  |  |
| Initial | 6,400 | 3,000 | 6,000 | 7,440 |
| 7 days later | 12,200 | 4,000 | 21,000 | Not measurable due to solidification |
| 175° C. heating, peel strength (kg/inch) | 5.4 | 5.5 | 5.2 | 4.9 |
| Formation of air bubbles | ○ | ○ | ○ | ○ |
| Coloring | ○ | ○ | ○ | △ |

As shown by Example 21, when a resin having a high alkali metal content is employed, a decrease is observed in the plastisol viscosity stability and in the peel strength. It is evident that a resin containing an alkali metal within a range of from 45 to 600 ppm is preferably employed. Further, the composition containing a high alkali metal content stays in the state of a plastisol for a period of about five days and then solidifies, and such a composition will be required to be used quickly.

EXAMPLES 22 TO 25 AND COMPARATIVE EXAMPLE 8

The adhesion strength to the polyethylene terephthalate film was evaluated.

Tests were conducted in the same manner as in Example 16 except that the type of the stabilizer and block dissociation-promoting agent was changed. The results are shown in Table 9. The test results of a plastisol wherein no adhesion-imparting agent was added, are also shown in Table 9.

TABLE 9

|  | Example 22 | Example 23 | Example 16 | Example 24 | Example 25 | Comparative Example 8 |
| --- | --- | --- | --- | --- | --- | --- |
| Paste resin | Same as used in Example 16 | | | | | |
| Stabilizer | A | B | C | D | E | C |
| Total alkali metal content (ppm) | 220 | 220 | 220 | 220 | 600 | 220 |
| Plastisol viscosity (cps) | | | | | | |
| Initial | 3,600 | 2,800 | 3,000 | 7,840 | 5,120 | 3,360 |
| 7 days later | 5,800 | 4,400 | 4,600 | 14,400 | 400,000 | 5,000 |
| Peel strength (kg/inch) 160° C. × 5 minutes | 1.0 | 0.8 | 0.5 | 0.4 | 0.8 | 0.1 |
| Formation of air bubbles | O | O | O | O | O | O |

Stabilizer:
(A) Tribasic lead sulfate
(B) Dibutyltin mercaptide
(C) Ba—Zn type stabilizer
(D) Ca—Zn type stabilizer
(E) Na—Zn type stabilizer (alkali metal content relative to the resin: 380 ppm)

Compositions according to the present invention show excellent adhesion also to the polyester-type film.

As shown by Examples 22 and 23, lead type and tin type stabilizers are preferred as the stabilizer and block dissociation-promoting agent, since they serve to improve the adhesion strength in a low temperature lamination.

EXAMPLE 26 AND COMPARATIVE EXAMPLE 9

By using a plastisol composition according to the present invention, the properties for application to an automobile undercoating and sealant, were evaluated. The blend for evaluation was as shown below, and the results of a plastisol in which the adhesion imparting agent used in Example 16 was added and a plastisol in which no such an agent was added, are shown in Table 10.

| | |
| --- | --- |
| Vinyl chloride paste resin (Homo-Poly, manufactured by Mitsubishi Kasei Vinyl Company average degree of polymerization P = 1500) | 40 parts by weight |
| Vinyl chloride paste resin (Co-Poly, manufactured by Mitsubishi Kasei Vinyl Company average degree if polymerization P = 1350) | 40 parts by weight |
| Vinyl chloride blending resin (manufactured by Mitsubishi Kasei Vinyl Company average degree of polymeriazation P = 1,000) | 20 parts by weight |
| DOP (plasticizer) | 120 parts by weight |
| Calcium carbonate (ground type, average particle size D = 5 um) | 200 parts by weight |
| Tribasic lead sulfate | 1 part by weight |
| Ba—Zn type stabilizer (AC303, tradename) | 2 parts by weight |
| DBP solution of the adhesion-imparting agent | 15 parts by weight |

The plastisol was prepared by mixing and kneading in the same manner as in Example 16, then adding the adhesion-imparting agent, and adding the plasticizer to bring the total content of the plasticizer to a predetermined level.

The plastisol was coated on a plate having an undercoating formed by cationic electrodeposition, in a thickness of 0.5 mm. Separately, a pair of undercoated electrodeposited plates were laminated with a coating layer of the plastisol composition having a thickness of 0.5 mm interposed therebetween in the form of a sandwiched structure. The coated plate and the laminate of the sandwiched structure were respectively heated at 130° C. for 30 minutes in an oven to obtain shaped products. With respect to the former, the 90° peel strength (pulling speed: 50 mm/min) was obtained, and with respect to the latter, the shearing peel strength (pulling speed: 5 mm/min) was obtained.

Further, with respect to the viscosity stability, the plastisol was left to stand at 40° C. for 72 hours, and the viscosity at 5 rpm was measured.

TABLE 10

| | Example 26 | Comparative Example 9 |
| --- | --- | --- |
| Plastisol composition | | |
| Amount of the solution | 15 | 0 |
| Effective NCO content (wt. %) in the plastisol | 0.09 | 0 |
| Peel strength | | |
| Shearing* (kg/cm$^2$) | 16 | 6 |
| 90° (kg/inch) | 1.8 | 0.02 |
| Plastisol viscosity (cps) | | |
| Initial | 10,000 | 30,000 |
| 72 hours later | 100,000 | 60,000 |

*Measuring method: JIS K 6830 (Method for testing an automobile sealing material)

It is evident that the plastisol composition according to the present invention has excellent adhesion strength to the cationic electrodeposition coated plate.

In the following Examples, the methods for the evaluation of the undercoating materials are as follows.

(1) Tests for the Viscosity and the Storage Stability of the Undercoating Materials (Plastisol Compositions)

The plastisol viscosity at 5 rpm was measured at a plastisol temperature of 40°±1° C. by using B8H Model viscometer #7 rotor, manufactured by Tokyo Keiki K. K.

The storage stability was determined in such a manner that a glass container containing the plastisol composition was immersed in a constant temperature water tank at a temperature of 40°±1° C., after a predetermined number of days, the composition was stirred gently for one minute by a stirring rod two hours before the measurement of the viscosity, and the plastisol viscosity was measured as mentioned above.

(2) Test for Shearing Peel Strength

The shearing adhesion strength was measured in accordance with JIS K 6830 (method for testing an automobile sealing material) by using a cationic electrodeposition coated plate with a coating layer as a test piece. The test was conducted with a plastisol layer thickness of 0.5 mm with heat treatment at a temperature of from 120° to 140° C. for 30 minutes under a pulling speed of 5 mm/min.

(3) Test for Water Resistance

The same test piece as used for the test for measuring the shearing peel strength in above item (2), was immersed in warm water at 40° C. for 7 days, and then dried in air for 1 day. Then, the shearing adhesion strength was measured in the same manner as in the above item (2) to determine the water resistance.

(4) Evaluation of Coloring

The coloring and the outer appearance of the vinyl chloride polymer layer in the coating after the shearing peel strength test in the above item (2), were examined by visual observation, and evaluated in accordance with the following standards.
○: No coloring
Δ: Some coloring
×: Substantial coloring

EXAMPLES 27 TO 30 AND COMPARATIVE EXAMPLES 10 AND 11

| | |
|---|---|
| Vinyl chloride polymer (paste resin) | 80 parts by weight |
| Blending resin | 20 parts by weight |
| Plasticizer (DOP) | 120 parts by weight |
| Filler (CaCO$_3$, $\overline{D}$ = 5 um) | 200 parts by weight |
| Stabilizer and block dissociation-promoting agent | 3 parts by weight |
| Solution of the adhesion-imparting agent | 15 parts by weight |

The above-identified components were left to stand in a constant temperature and humidity chamber at 23° C. under a relative humidity of 50% for a few days, then weighed and mixed in a constant temperature room in the following manner.

The paste resin, the blending resin, DOP, the filler and the stabilizer and block dissociation-promoting agent were introduced into a Hobart mixer, and uniformly mixed. Then, the solution of the adhesion-imparting agent was added, and the mixture was again uniformly mixed. Then, the mixture was vacuumed for defoaming to obtain a plastisol composition as an undercoating material. The detailed composition of the undercoating material, the plastisol viscosity, the shearing peel strength, the coloring state, etc. are shown in Table 11.

For the purpose of comparison, tests were conducted in the same manner as in the above Example with respect to the composition wherein no adhesion-imparting agent was added and the composition wherein a commercially available adhesion-imparting agent was added. The results are also shown in Table 11.

TABLE 11

| | Example | | | | Comparative Example | |
|---|---|---|---|---|---|---|
| | 27 | 28 | 29 | 30 | 10 | 11 |
| Paste resin | Average degree of polymerization ($\overline{P}$) 1500 Vinyl chloride homopolymer | | | $\overline{P}$ 1400, Vinyl chloride-vinyl acetate copolymer (vinyl acetate content: 4 wt. %) | $\overline{P}$ 1500 Vinyl chloride homopolymer | |
| Blending resin | $\overline{P}$ 1000 Average particle size: 35 μm Vinyl chloride-vinyl acetate copolymer (vinyl acetate content: 3 wt. %) | | | | | |
| Solution of the adhesion-imparting agent* | A | | B | | None | C |
| Stabilizer and block dissociation-promoting agent | Ba—Zn type stabilizer | Tribasic lead sulfate | | | | |
| Plastisol viscosity (poise) | 154 | 200 | 188 | 208 | 200 | 105 |
| Storage stability (poise) | | | | | | |
| 1 day later | 174 | 230 | 214 | 309 | 220 | 108 |
| 3 days later | 184 | 257 | 241 | 774 | 240 | 120 |
| Shearing peel strength (kg/cm$^2$) | | | | | | |
| Heating 130° C. × 30 min | 7.5 | 15 | 17.7 | 18 | 4.5 | 12.2 |
| Peeling | Cohesive failure | | | | Interfacial peeling | Cohesive failure |
| Coloring | ○ | ○ | ○ | ○ | ○ | × (yellowing) |

*A: DBP solution containing 33% by weight of a TDI isocyanurate polymer blocked with p-oxybenzoic acid-2-ethylhexyl ester (average molecular weight $\overline{MW}$ 1300), effective NCO: 2.52 wt. %.
B: A DBP solution containing 32% by weight of a TDI polymer blocked with nonyl phenol (average molecular weight $\overline{MW}$ 1182), effective NCO: 2.54 wt. %.
C: A polyaminoamide type Eurutek 506 (manufactured by Schelling Co.).

Cohesive failure was observed in all cases of the peeling states in Examples 27 to 30 wherein undercoating materials of the present invention were used, thus indicating excellent adhesion properties. The shearing peel strength value remarkably improves by the use of a lead type stabilizer. The viscosity stability is good in the case of a combination of a paste resin of the homopolymer and a blending resin of the copolymer.

A further feature of the present invention is that as compared with the commercial product in Comparative Example 11, no substantial thermal coloring is observed after the heat treatment for lamination.

EXAMPLES 31 AND 32

Tests were conducted in the same manner as in Example 27 except that the composition of the vinyl chloride polymer i.e. the paste resin and the blending resin was changed. The results are shown in Table 12 together with the result of Example 27.

TABLE 12

| | Example | | |
|---|---|---|---|
| | 27 | 31 | 32 |
| Paste resin | | Same as | Same as |
| Blending resin | | used in Example 30 | used in Example 27 |
| | | P 1000 Average particle size: 40 μm | Vinyl chloride homopolymer |
| Solution of the adhesion-imparting agent | | A | A |
| Stabilizer and block dissociation-promoting agent | | Ba—Zn type stabilizer (AC-303, manufactured by Adeka Argus K.K.) | |
| Plastisol viscosity (poise) | 154 | 200 | 116 |
| Storage stability (poise) | | | |
| 1 day later | 174 | 401 | 119 |
| 3 days later | 184 | 765 | 123 |
| Shearing peel strength (kg/cm$^2$) | | | |
| Heat treatment | | | |
| 120° C. × 30 min | 7.4 | 8.3 | 3.9 |
| 130° C. × 30 min | 7.5 | 8.3 | 5.7 |
| 140° C. × 30 min | 8.2 | 8.3 | 7.9 |
| Coloring | ○ | ○ | ○ |

Examples 27, 31 and 32 show the low temperature melting properties and the low temperature adhesive properties according to the present invention.

According to the present invention, a uniform cohesive failure state is observed at the peeled surface even under a low temperature lamination condition at 120° C. for 30 minutes. It is seen that among them, the above-mentioned resin blend of Example 27 is preferred as a combination of resins which provides good physical properties such as shearing peel strength as well as excellent viscosity stability.

EXAMPLES 33 TO 38

| Paste resin (same as used in Example 27) | 80 parts by weight |
|---|---|
| Blending resin (same as used in Example 27) | 20 parts by weight |
| Butylbenzyl phthalate (BBP) | 130 parts by weight |
| CaCO$_3$ (average particle size D = 5 um) | 200 parts by weight |
| Tribasic lead sulfate | 5 parts by weight |
| Solution of adhesion-imparting agent | Prescribed amount |

With the above composition wherein the type and amount of the adhesion-imparting agent were varied, the evaluation was carried out in the same manner as in Examples 27 to 30. The results are shown in Table 13.

TABLE 13

| | Example | | | | | |
|---|---|---|---|---|---|---|
| | 33 | 34 | 35 | 36 | 37 | 38 |
| Solution of the adhesion-imparting agent | A | A | A | B | B | B |
| Amount of the solution added (phr) | 10 | 15 | 20 | 10 | 15 | 20 |
| Amount of the block added (phr) | 3.3 | 5.0 | 6.6 | 3.2 | 4.8 | 6.4 |
| Plastisol solution (poise) Initial | 1048 | 880 | 720 | 1656 | 1352 | 1088 |
| Storage stability (poise) | | | | | | |
| 3 days later | 1136 | 1016 | 864 | 1696 | 1376 | 1120 |
| 7 days later | 1352 | 1120 | 992 | 1736 | 1392 | 1152 |
| Shearing peel strength (kg/cm$^2$) | | | | | | |
| Heat treatment 120° C. × 30 min | 13 | 17 | 19 | 13 | 12 | 12 |
| Peeling | Interfacial peeling | Cohesive failure | | Interfacial peeling | Cohesive failure | |
| Coloring | ○ | ○ | ○ | ○ | ○ | ○ |

As shown by Examples 34 and 37, in each of the adhesion-imparting agents A and B, adequate adhesive properties to the cation electrodeposition coated plate can be obtained if the blocked diisocyanate polymer component is added in an amount of about 5 parts by weight and at least 1% of the entire plastisol.

EXAMPLES 39 AND 40 AND COMPARATIVE EXAMPLE 12

| Paste resin (VINIKA P-540, manufactured by Mitsubishi Chemical Industries Co., Ltd.) | 80 parts by weight |
|---|---|
| Blending resin (3% copolymer) (same as used in Example 27) | 20 parts by weight |
| Polyester type plasticizer (MW = 1200) | 100 parts by weight |
| B.B.P. | 20 parts by weight |
| Tribasic lead sulfate | 3 parts by weight |
| CaCO$_3$ (D = 5 um) | 200 parts by weight |
| Adhesion-imparting agent | 5 parts by weight (effective amount) |
| Diluent (mineral spirit) | 10 parts by weight |

With the above composition wherein A, B or C was used as the adhesion-imparting agent, the evaluation was carried out. The diluent was added later and mixed. The results are shown in Table 14.

TABLE 14

| | Example 39 | Example 40 | Comparative Example 12 |
|---|---|---|---|
| Adhesion-imparting agent | A | B | C |

TABLE 14-continued

|  | Example 39 | Example 40 | Comparative Example 12 |
|---|---|---|---|
| Plastisol viscosity (poise) Initial | 200 | 96 | 424 |
| Storage stability (poise) | | | |
| 2 days later | 240 | 97 | 432 |
| 3 days later | 260 | 98 | 466 |
| Shearing peel strength (kg/cm$^2$) | | | |
| Heat treatment 120° C. × 30 min | 11.0 | 11.0 | 10.0 |
| Peeling | Cohesive failure | | Interfacial peeling |
| Water resistance (kg/cm$^2$) | 10.0 | 10.3 | 5.5 |
| Peeling | Cohesive failure | | Interfacial peeling |

In the case of the adhesion-imparting agents A and B according to the present invention, the deterioration in the adhesive properties or adhesion after the hot water dipping treatment is small, thus indicating that the water resistance is improved remarkably as compared with C of the Comparative Example 12.

EXAMPLES 41 TO 44

Tests were conducted in the same manner as in Example 40 except that in the composition in Example 40, a half (40 phr) of 80 phr of the paste resin VINIKA P-540 was substituted by the following paste resins, and the amount of the diluent was reduced to 8 phr, and various properties were measured. The results are shown in Table 15.

As the vinyl chloride polymer of the present invention, various homopolymers and copolymers may be used alone or in combination as a mixture.

We claim:

1. A plastisol composition consisting essentially of a vinyl chloride polymer, a plasticizer and an adhesion-imparting agent of an aromatic diisocyanate polymer blocked with an oxybenzoic acid ester.

2. The plastisol composition according to claim 1, wherein the diisocyanate polymer contains isocyanurate rings.

3. The plastisol composition according to claim 1, wherein the aromatic diisocyanate is tolylene diisocyanate or diphenylmethane diisocyanate.

4. The plastisol composition according to claim 1 wherein the adhesion-imparting agent has an effective isocyanate content of from 0.03 to 1% by weight based on the total weight of the plastisol composition.

5. An undercoating material composed of a plastisol composition consisting essentially of a vinyl chloride polymer and a plasticizer as main components, and further containing an aromatic diisocyanate polymer blocked with an oxybenzoic acid ester, as an adhesion-imparting agent.

6. The undercoating material according to claim 5, wherein the diisocyanate polymer contains isocyanurate rings.

7. The plastisol composition according to claim 1, wherein said plasticizer is a phthalate plasticizer, a fatty acid ester plasticizer, a phosphate plasticizer or an epoxy plasticizer.

8. The plastisol composition according to claim 1, wherein said plasticizer is present in said composition in an amount ranging from 30–600 parts by weight relative to 100 parts by weight of the vinyl chloride resin.

* * * * *

TABLE 15

|  | Example | | | |
|---|---|---|---|---|
|  | 41 | 42 | 43 | 44 |
| Paste resin used in combination | — | P-1200 Vinyl chloride homopolymer | VINIKA P 100 (P 1400, vinyl chloride-2-hydroxypropyl acrylate copolymer) | VINIKA P 500 (P 1400, vinyl chloride-vinyl acetate copolymer, vinyl acetate content: 4 wt. %) |
| Initial plastisol viscosity (poise) | 310 | 240 | 328 | 352 |
| Storage stability (poise) | | | | |
| 2 days later | 313 | 247 | 328 | 493 |
| 6 days later | 320 | 256 | 328 | 1160 |
| Shearing peel strength (kg/cm$^2$) | | | | |
| Heat treatment 120° C. × 30 min | 11.0 | 9.5 | 12.0 | 14.0 |
| Peeling | | | Cohesive failure | |
| Coloring | ◯ | ◯ | ◯ | ◯ |